United States Patent
Breyer et al.

(10) Patent No.: US 6,530,528 B2
(45) Date of Patent: Mar. 11, 2003

(54) REFRIGERANT EXPANSION VALVE HAVING ELECTRICALLY OPERATED INLET SHUTOFF WITH IMPROVED ARMATURE DAMPENING

(75) Inventors: William L. Breyer, Oxford, MI (US); Patrick A. Bloedel, Saint Clair Shores, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/918,424

(22) Filed: Jul. 27, 2001

(65) Prior Publication Data

US 2003/0019225 A1 Jan. 30, 2003

(51) Int. Cl.[7] ................................................ F25B 41/04
(52) U.S. Cl. .................... 236/92 B; 62/225; 251/129.15
(58) Field of Search ........................ 62/225; 236/92 B; 251/129.15

(56) References Cited

U.S. PATENT DOCUMENTS

| 4,299,252 | A | * | 11/1981 | Reinicke ................... 137/625.5 |
| 4,614,327 | A | * | 9/1986 | Valbjorn et al. .......... 236/92 B |
| 4,947,893 | A | * | 8/1990 | Miller et al. ........... 137/625.65 |
| 5,979,780 | A | * | 11/1999 | Malone et al. ............ 236/92 B |
| 6,325,296 | B1 | * | 12/2001 | Dayton ..................... 236/92 B |

* cited by examiner

Primary Examiner—William E. Tapolcai
(74) Attorney, Agent, or Firm—Joseph J. Pophal

(57) ABSTRACT

A combination refrigerant expansion valve adapted for operation by a thermally responsive element, and a solenoid actuated, preferably pilot operated inlet shutoff valve. The solenoid has a resilient elastomeric stop-ring for cushioning deceleration and limiting travel of the armature to prevent closing of the working air gap between the armature and a pole piece. The armature also has a cross port therethrough to alleviate flow-induced pressure decrease on the distal end of the armature from causing the armature to stick in the actuated position when the coil is de-energized.

12 Claims, 2 Drawing Sheets

REFRIGERANT EXPANSION VALVE HAVING ELECTRICALLY OPERATED INLET SHUTOFF WITH IMPROVED ARMATURE DAMPENING

BACKGROUND OF THE INVENTION

The present invention relates to refrigerant expansion valves of the type typically operated by a thermally responsive sensor such as a fluid filled capsule and which employ in combination an electrically operated shutoff valve at the inlet of the expansion valve. Valves of this type have found applications in motor vehicle passenger compartment air conditioning systems where high ambient thermal loads are encountered and rapid changes in refrigerant flow are often required to maintain passenger comfort.

Heretofore, such combination thermally operated expansion valves with an electrically operated inlet shutoff valve have experienced problems where the electrically operated inlet shutoff valve included a solenoid actuator. Valves of this type have encountered unacceptable levels of noise upon energization of the inlet valve. This noise has been attributed to the solenoid armature reaching a sufficient velocity to generate audible noise when the armature reached the end of its travel by closing a working air gap.

Furthermore, where such valves are pilot operated, upon opening of the main valve the velocity of the fluid flowing past the pilot valve opening creates an aspiration effect generating a reduced pressure through the pilot passage and the pilot chamber on the distal end of the pilot passage. The reduced pressure in the pilot chamber has resulted in sticking of the armature in the open position and failure of the valve to close upon de-energization of the solenoid even under the urging of a return spring.

Thus, it has been desired to provide a way or means of reducing the opening noise of a solenoid operated shutoff valve at the inlet of a refrigerant expansion valve and to prevent sticking of the solenoid armature in the open position upon energization of the valve and flow of refrigerant through the valve. It has further been desired to provide a valve without opening noise, which is resistant to sticking upon electrical energization of the solenoid and which is low in manufacturing cost and easy to assemble so as to be competitive in high volume mass production for automotive air conditioning system applications.

BRIEF SUMMARY OF THE INVENTION

The present invention provides a refrigerant expansion valve with a body having an inlet and outlet with an expansion valve member disposed in the flow path between the inlet and the outlet. Movement of the expansion valve member is effected by an operating member or rod adapted for attachment to a thermal actuator in a manner well known in the art. The valve body has attached thereto a solenoid operated inlet shutoff valve with a valve seat disposed in the flow path between the expansion valve and the inlet. An inlet valve member is disposed on the inlet valve seat and connected to the armature of the solenoid operator for effecting movement of the inlet valve member upon energization of the solenoid. In the preferred embodiment, the inlet valve member includes a pilot passage and pilot valve member disposed within the armature.

The armature is slidably moveable in a pressure-sealed armature guide preferably having a pole piece at the end thereof remote from the pilot valve and the armature defines a working air gap with the pole piece. A resilient limit stop is provided on the pole piece to cushion the deceleration of the armature and limit the closing of the working air gap to prevent noise and armature sticking.

A cross port is provided in the armature to alleviate the problem of reduced pressure on the distal end of the armature caused by aspiration during flow past the pilot passage.

DETAILED DESCRIPTION OF THE INVENTION

Figure 1:
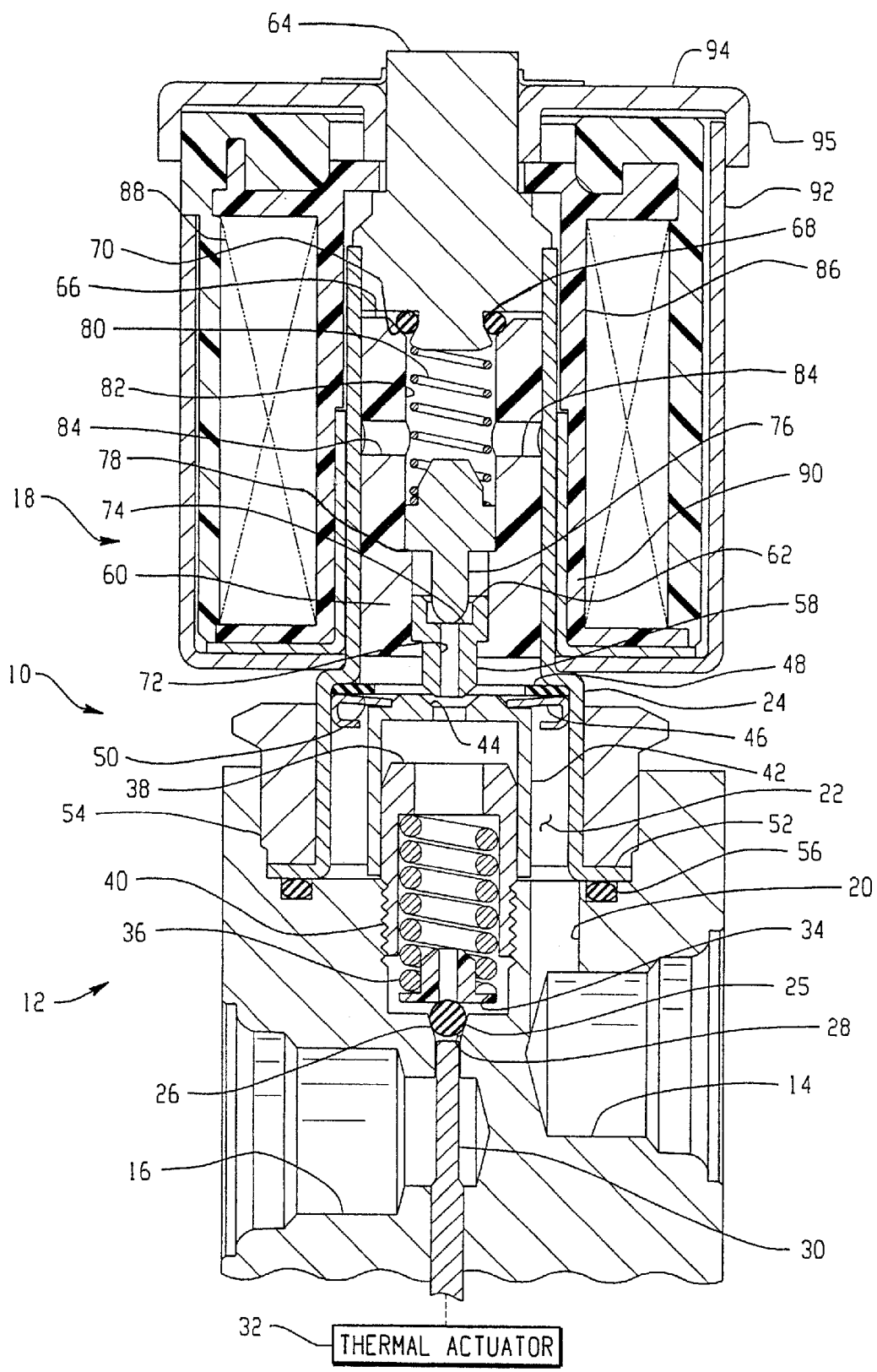
FIG. 1 is a cross-section of the expansion valve with solenoid operated inlet shutoff valve of the present invention in the energized condition; and, FIG. 2 is a view similar to FIG. 1 with the solenoid de-energized.

Referring to FIG. 1, the valve assembly of the present invention is indicated generally at 10 and includes an expansion valve indicated generally at 12 having an inlet 14, an outlet 16 and a solenoid operated inlet shutoff valve assembly indicated generally at 18. The expansion valve 12 includes a riser passage 20 communicating with the inlet 14 and a valving chamber 22 formed within an armature guide 24, which valving chamber 22 communicates with an expansion valve member 25 seated on an expansion valve seat 26 for controlling flow through a flow passage 28 which communicates with the outlet 16.

The expansion valve member 25 is contacted by an operating member 30 in the form of a rod which is adapted for connection to a thermal actuator 32 in a manner well known in the art.

The expansion valve member 25 is retained by an annular retainer 34 which has a shoulder formed thereon with the lower end of a spring 36 registered thereagainst. The upper end of the spring contacts the under surface of an adjustable retainer 38 secured in the block by threads indicated by reference numeral 40.

A valve seat member 42, preferably having a generally inverted cup-shaped configuration, is received over the retainer 38; and, the valve seat member 42 has a valve seat 44 formed in the upper end thereof and is retained in the block by a spider clip 46 and a resilient washer 48 which contacts the undersurface of an annular shoulder 50 formed in the armature guide 24. The armature guide also has a radially outwardly extending flange 52 formed on the lower end thereof and which is retained in the block by a threaded collar 54 received thereover and registered thereagainst. The flange 52 is sealed by a suitable seal ring 56 disposed in the block.

Valve seat 44 has an inlet shutoff valve member 58 disposed adjacent thereto and aligned therewith as shown in FIG. 1 in the open position.

The solenoid operator assembly 18 includes an armature 60 slidably disposed within the armature guide 24; and, the armature has an annular shoulder 62 formed in the lower end thereof which has registered thereagainst the inlet shutoff valve member 58. The armature guide 24 has a pole piece 64 secured to the upper end thereof and in fluid pressure sealing engagement therewith; and, pole piece 64 forms a working air gap with the upper end 66 of the armature. The pole piece 64 has secured thereon a resilient annular limit stop 68 on the lower surface thereof, which, in the present practice of the invention is preferably an elastomeric o-ring which is contacted by a circular chamfer 70 formed on the upper surface of the armature 60.

With the armature in the position shown in FIG. 1 the coil 88 is energized, the limit stop ring 68 has cushioned the deceleration of the armature 60 and prevents complete closing of the air gap between the upper surface of the armature 66 and the under surface of the pole piece 64.

The inlet shutoff valve member 58 has a pilot passage 72 formed therethrough with a pilot valve seat 74 formed at the upper end of passage 72 with a pilot valve member 76 disposed adjacent thereto. The pilot valve member 76 is lifted by contact with a shoulder 78 formed in the interior of the armature 60; and, the pilot valve member is biased thereagainst by the lower end of a spring 80 which has its upper end registered against the undersurface of pole piece 64.

The pilot valve is slidably received in a bore 82 formed in the armature 60; and, the bore 82 has at least one, and preferably two, cross ports 84 formed therein. The cross ports 84 serve to alleviate any reduced pressure formed on the upper side of the armature by aspiration of flow past the pilot passage 72.

A coil bobbin 86 having a coil 88 wound thereon is received over the armature guide with an annular flux collector 90 disposed therein and an outer casing 92 of magnetically permeable material disposed thereover to complete the flux loop about the coil. The bobbin and coil are retained on the armature guide by cover 94 which is preferably apertured to fit over the pole piece 64 and has an outer peripheral flange 95 fitting over the casing 92.

Figure 2:
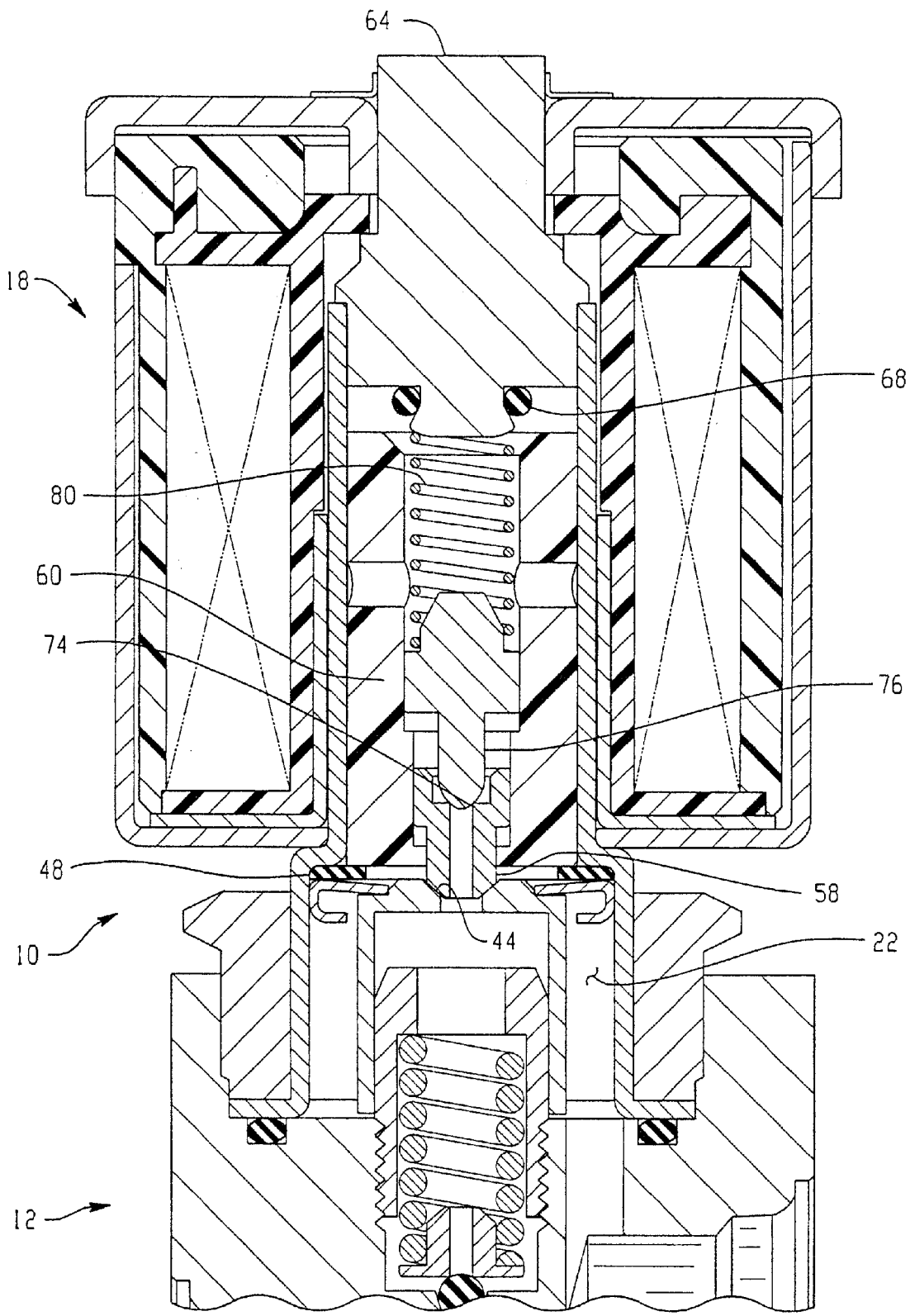

Referring to FIG. 2, the inlet shutoff valve member 58 is shown with the coil de-energized as contacting inlet shutoff valve seat 44 with the armature 60 in the lowered position under the urging of spring 80; and, in turn urging the pilot valve member 76 into contact with pilot valve seat 74. The air gap between the upper end 66 of the armature and the under surface of pole piece 64 is thus in its widest condition, with the lower end of the armature registered against the washer 48. In the condition shown in FIG. 2 flow from inlet riser passage 20 into chamber 22 is thus blocked by valve member 58 from the expansion valve member 25.

The present invention thus provides a unique, novel and relatively low cost solenoid operated inlet shutoff valve in combination with a refrigerant expansion valve with the opening movement of the solenoid armature of the inlet shutoff valve dampened by a resilient dampening member; and, suction created above the armature by flow past the pilot opening in the inlet shutoff valve member alleviated by cross passages formed in the armature.

Although the invention has hereinabove been described with respect to the illustrated embodiments, it will be understood that the invention is capable of modification and variation and is limited only by the following claims.

We claim:

1. In combination a refrigerant expansion valve with an integral electrically operated inlet shut-off valve comprising:
   (a) a valve body having an inlet, adapted for connection to a source of pressurized liquid refrigerant, an outlet and an expansion valve member moveably disposed with body for controlling flow to the outlet;
   (b) an actuating member disposed in said valve body, adapted for connection to a thermally responsive actuator, and operative for effecting movement of the expansion valve member;
   (c) a shut-off valve seat disposed in the flow path between the inlet and the expansion valve member including a shut-off valve member moveable with respect thereto between a first position permitting a flow to the expansion valve member and a second position blocking flow to the expansion valve member; and,
   (d) a solenoid actuator attached to the valve body and having an armature moveable in a fluid pressure sealed armature guide and operable for, upon energization, effecting movement of the shutoff valve member between said first and second positions said armature having a cross port therein for alleviating any reduced fluid pressure, formed on an end of said armature remote from the shut-off valve seat, and acting between the armature and armature guide.

2. The combination defined in claim 1, wherein said inlet shutoff valve member includes a pilot valve.

3. The combination defined in claim 1, wherein said solenoid actuator includes a pole piece defining a working air gap with the armature; and, said pole piece includes a resilient toroidal limit stop contacting one end of the armature for: limiting closing of the air gap, preventing noise, eliminating armature sticking and controlling armature deceleration.

4. The combination defined in claim 3, wherein said limit stop comprises a resilient toroidal member.

5. The combination defined in claim 1, wherein said armature has a central bore therein with a pilot valve seat and a pilot valve slidably disposed therein and said cross port is disposed distal said pilot valve.

6. The combination defined in claim 1, wherein said armature comprises an annular member with said shutoff valve member slidably retained in one end thereof and said cross port is disposed intermediate said shutoff valve member and an end distal said one end.

7. The combination defined in claim 1, wherein said armature guide includes a pole piece attached to one end thereof, said pole piece having a toroidal elastomeric limit stop thereon for: limiting movement of said armature in a direction toward said pole piece, preventing noise, eliminating armature sticking and controlling armature deceleration.

8. The combination defined in claim 7, wherein said toroidal elastomeric limit stop is adapted to contact a circular chamfer formed on an upper surface of said armature.

9. The combination defined in claim 1, wherein said valve body inlet is separated from said armature cross port.

10. A method of making a refrigerant expansion valve with an integral electrically operated inlet shutoff valve comprising:
   (a) providing a valve body having an inlet and outlet and forming a flow path therebetween and disposing a moveable expansion valve member in the flow path between the inlet and outlet;
   (b) disposing an operating member in contact with the expansion valve member and adapting the operating member for attachment of a thermal actuator;
   (c) disposing a shutoff valve seat in the flow path between the inlet and the expansion valve member and disposing a shutoff valve member on the shutoff valve seat;
   (d) disposing a solenoid with a moveable armature in a pressure seated guide on the valve body and contacting the shutoff valve member with the armature for effecting movement of the shutoff valve member upon energization of the solenoid;
   (e) forming a cross port in the armature for alleviating any reduced fluid pressure formed on an end of said armature remote from the shut-off valve seat, and acting between the armature and the guide; and,
   (f) forming a working air gap between the armature and the guide and disposing a resilient toroidal limit-stop in the guide and limiting closing of the air gap in order to prevent noise and armature sticking.

11. The method defined in claim 10, wherein said step of forming a working air gap includes disposing a pole piece in the guide adjacent one end of the armature.

12. The method defined in claim 10, wherein said step of disposing a shutoff valve member includes disposing a pilot valve member in the flow path.

* * * * *